United States Patent [19]

Poenisch et al.

[11] Patent Number: 5,021,980

[45] Date of Patent: Jun. 4, 1991

[54] REMOTE MEASUREMENT OF TEMPERATURE

[75] Inventors: Paul Poenisch, Santa Clara; Keith Hansen, San Jose, both of Calif.

[73] Assignee: LSI Logic Corporation, Milpitas, Calif.

[21] Appl. No.: 313,577

[22] Filed: Feb. 21, 1989

[51] Int. Cl.$^5$ ............... G06F 15/42; G06F 15/46; G06F 15/20; G01N 25/00

[52] U.S. Cl. ............................ 364/557; 364/550; 374/9; 374/120

[58] Field of Search ............... 374/9, 100, 109, 126, 374/161, 120; 356/43, 45, 51, 320; 364/525, 550, 557

[56] References Cited

U.S. PATENT DOCUMENTS

| | | | |
|---|---|---|---|
| 4,142,417 | 3/1979 | Cashdollar et al. | 356/45 |
| 4,750,139 | 6/1988 | Dils | 374/161 |

FOREIGN PATENT DOCUMENTS

| | | | |
|---|---|---|---|
| 2572523 | 5/1986 | France | 356/43 |
| 0981833 | 12/1982 | U.S.S.R. | 374/2 |
| 8606163 | 10/1986 | World Int. Prop. O. | 364/557 |

OTHER PUBLICATIONS

"Spectral Method of Determining the Emissivity of Hot Surfaces", N. S. Tskhai; Jour. App. Spect., Mar. 1978, (vol. 27. No. 3); pp. 1111–1115.

"High Speed Optical Pyrometer"; Rev. of Scien. Inst. Jun. 1970, (vol. 41, No. 6); pp. 827–834.

You–Wen Zhang et al., "Quantitative Measurements of Ambient Radiation, Emissivity, and Truth Temperature of a Greybody: Methods and Experimental Results", Applied Optics, Oct. 15, 1986, vol. 25, No. 20, pp. 3683–3689.

T. J. Rockstroh et al., "Infrared Thermographic Temperature Measurement During Laser Heat Treatment", Applied Optics, May 1, 1985, vol. 24, No. 3, pp. 1343–1345.

James L. Cogan, "Remote Sensing of Surface and Near Surface Temperature from Remotely Piloted Aircraft", Applied Optics, Apr. 1, 1985, vol. 24, No. 7, pp. 1030–1036.

M. A. Ordal et al., "Optical Properties of Fourteen Metals in the Infrared and Far Infrared: Al, Co, Cu, Au, Fe, Pb, Mo, Ni, Pd, Pt, Ag, Ti, V, and W.", Applied Optics, Dec. 15, 1985, vol. 24, No. 24, pp. 4493–4499.

John R. Stearns, "Airborne Infrared Observations and Analyses of a Large Forest Fire", Applied Optics, Aug. 1, 1986, pp. 2554–2562.

Primary Examiner—Kevin J. Teska
Attorney, Agent, or Firm—Skjerven, Morrill, MacPherson, Franklin & Friel

[57] ABSTRACT

A method for determination of the true temperature T and true radiative emissivity of a body at temperature T, using measurements of total energy radiated by the body in two or more adjacent wave length ranges $\lambda_1 \leq \lambda \leq \lambda_2$ and $\lambda_3 \leq \lambda \leq \lambda_4$; the wave length ranges may partially overlap or may be adjacent but non-overlapping.

6 Claims, 3 Drawing Sheets

REMOTE MEASUREMENT OF TEMPERATURE

FIELD OF THE INVENTION

This invention relates to determination of the true temperature of a body and true radiative emissivity of the body at that temperature.

BACKGROUND OF THE INVENTION

Noncontact measurement of the temperature (assumed to be substantially uniform) of a thermally radiating body at elevated temperature is difficult, for a number of reasons. First, the body is usually a "greybody", and thus has an associated emissivity parameter $\beta$ (also known) that is less than 1.0. A thermal "blackbody" would have an emissivity parameter $\beta$ that is $=1.0$ for all wavelengths. Second, the emissivity varies with the wavelength at which the thermal radiation is measured. Third, the perceived temperature and emissivity will be affected by any intervening medium, such as air or other low pressure gas, that the body is positioned in. This third difficulty may be substantially avoided by conducting the measurements in a high vacuum environment.

Recently, some workers have published discussions of remote sensing of temperature, not necessarily uniform, of a radiating body and possible discrimination between radiation emitted by the body and radiation emitted by other objects adjacent to the body. For example, Cogan, in "Remote Sensing of Surface and Near Surface Temperature from Remotely Piloted Aircraft," Applied Optics 24 (1985) 1030-1036, discusses a technique for obtaining the temperature of specific water and land surfaces that are adjacent to other radiating bodies. Cogan utilizes a normalized radiance, which is the product of target radiance and the response curve function for the measuring device, both wavelength dependent, integrated over a predetermined wavelength range and divided by the integral of the response curve function over the same wavelength range. Cogan also utilizes a mean wavelength, weighted by the response curve function, in the well known Planck formula, Equation (2) below, to determine a measured mean atmospheric temperature. However, Cogan does not take separate account of the wavelength-dependent emissivity or decompose the radiation into a sequence of wavelength ranges for purposes of separate determination of the true temperature of the radiating body and the true body emissivity in a given wavelength range.

Rockstroh and Mazumder, in "Infrared Thermographic Temperature Measurement During Laser Heat Treatment," Applied Optics, 24 (1985) 1343-1345, simultaneously use a thermocouple to measure ambient temperature and a thermographic system to measure the greybody temperature of an adjacent body; and they attempt to predict local surface temperature of the greybody, assuming a constant emissivity of 0.8. Wavelength dependence of emissivity is not addressed, and no separate account is taken of the wavelength dependence of the radiance itself.

The apparent temperatures of actively burning regions and burned over regions in a forest fire are assessed by Stearns et al. in "Airborne Infrared Observations and Analyses of a Large Forest Fire," Applied Optics (1986) 2554-2562. Thermal scanners are used with small fields of view to determine apparent temperature of different regions in and around an active forest fire. The spectral-radiance of a forest fire is obtained as a function of wave number (cm$^{-1}$) at a quoted spectral-resolution of 0.95 cm$^{-1}$. The method used, if any, for accounting for the wavelength dependence of emissivity is not disclosed in the Stearns et al. paper, although a method of indirectly determining apparent temperature of local areas adjacent to a forest fire is apparently employed.

In "Quantative Measurements of Ambient Radiation, Emissivity, and Truth Temperature of a Greybody: Methods and Experimental Results," Applied Optics (1986) 3683-3689, Zhang, Zhang and Klemas discuss the contribution to radiance from self-radiation of a target and from ambient radiation reflected by the target. This paper notes the central importance of the emissivity and the truth temperature of a greybody, and it formally utilizes the Planck formula given in Equation (2) below, to formally manipulate certain integral expressions for body radiance in the presence of reflected radiation that arises from adjacent objects. The paper discusses the difficulty of distinguishing between temperatures of two bodies with similar but not identical emissivities and presents a method for obtaining the approximate emissivity of a greybody, where the body temperature can be both measured accurately and increased or decreased by a controllable amount. However, the possible wavelength dependence of emissivity is not separately taken account of in this paper.

The subject invention provides method and apparatus for noncontact determination of the temperature and the emissivity, within a predetermined narrow wavelength range, of a radiating body.

SUMMARY OF THE INVENTION

One purpose of this invention is to provide a method for determining simultaneously temperature and the radiative emissivity, in one or more narrow predetermined wavelength ranges, of a thermally radiating body that is at a substantially uniform temperature.

Another purpose is to provide a method and apparatus for producing electromagnetic radiation of wavelengths in a narrow predetermined wavelength range that may be used in determining the temperature and radiative emissivity of a body as indicated above.

Other purposes of the invention, and advantages thereof, will become clear by reference to the detailed description and the accompanying drawings.

The above purposes may be realized in accordance with the invention by a procedure which includes measuring total energy $\Delta E_{12}$ and $\Delta E_{34}$ radiated by a body of volume V, of unknown temperature T and of unknown radiative emissivity $\beta$ in each of two predetermined, adjacent wavelength ranges $\lambda_1 \leq \lambda \leq \lambda_2$ and $\lambda_3 \leq \lambda \leq \lambda_4$, respectively; forming the differentials $R_{12} = \Delta E_{12}/(\lambda_2 - \lambda_1)V$ and $R_{34} = \Delta E_{34}/(\lambda_4 - \lambda_3)V$; expressing the logarithms of these differentials as linear functions of the variables $\log_e(\beta)$ and $1/T$ in the form $$\log_e(R_{12}) = a_{12} + b_{12}\log_e(\beta) + c_{12}\left(\frac{1}{T}\right),$$

$$\log_e(R_{34}) = a_{34} + b_{34}\log_e(\beta) + c_{34}\left(\frac{1}{T}\right),$$

where $\log_e(X)$ represents the natural logarithm function (often denoted also as $\ln[X]$), $a_{12}$, $b_{12}$, $c_{12}$, $a_{34}$, $b_{34}$ and $c_{34}$ are known parameters that are substantially independent of the variables $\beta$ and T and each such parameter may be determined from a knowledge of the wavelength values $\lambda_1$ and $\lambda_2$ or of the wavelength values $\lambda_3$ and $\lambda_4$; and determining the quantities T and $\beta$ substantially according to the relations $$\frac{1}{T} = \frac{b_{34}(\log_e R_{12} - a_{12}) - (\log_e R_{34} - a_{34})}{c_{12}b_{34} - c_{34}b_{12}},$$

$$\log_e(\beta) = \frac{c_{12}(\log_e R_{34} - a_{34}) - c_{34}(\log_e R_{12} - a_{12})}{c_{12}b_{34} - c_{34}b_{12}}.$$

BRIEF DESCRIPTION OF THE DRAWINGS

FIG. 1 exhibits a discrete embodiment suitable for producing and analyzing four wavelength ranges, and FIG. 2 exhibits a monolithic embodiment suitable for producing and analyzing a range of wavelengths of arbitrary width.

DETAILED DESCRIPTION OF THE INVENTION

Figure 1:
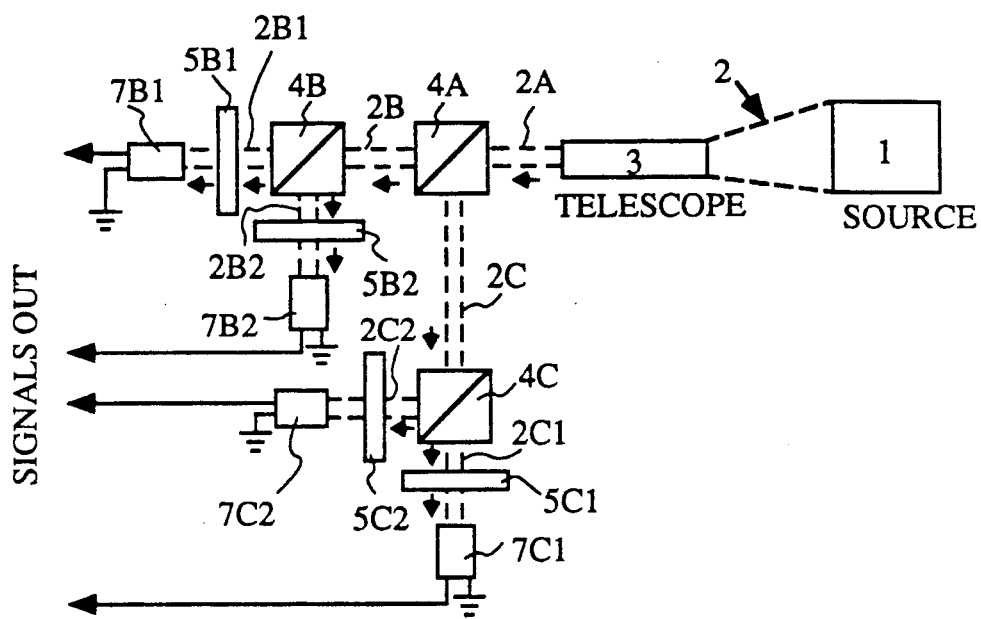
FIGS. 1 and 2 are schematic views of two different embodiments of apparatus suitable for producing, from a beam of electromagnetic radiation containing a band of wavelengths, radiation in two or more predetermined adjacent narrow wavelength ranges.

This invention is intended to allow the measurement of the temperature of an object without physical contact with the object, independent of the composition, surface characteristics or transparency of the object. The nominal temperature measuring range is from about 350° C. to about 1500° C., but this range can be extended by the use of optical components and sensors that are compatible with the appropriate wavelengths $\lambda$ of light ($\lambda > 3$ $\mu$m for lower temperatures, $\lambda < 0.5$ $\mu$m for higher temperatures).

Current temperature measurement devices using optical techniques rely on measurement of the total amount of light emitted by an object between two widely spaced wavelength (usually in the infrared). This measurement is related to the temperature of the object by the relation $$T = (R_T/\beta k)^{\frac{1}{4}},$$

where $R_T$ is the total radiation measured, T is the object temperature in °K, k is the Stefan-Boltzmann constant and $\beta$ is interpreted as an emissivity parameter ($0 \leq \beta \leq 1$).

One problem with this method is that the value of emissivity $\beta$ varies with the object being measured. For scientific purposes, such as the measurement of plasma temperatures and other well characterized objects, emissivity $\beta$ can be determined by careful measurement and the measuring device can be calibrated for that object. However, in industrial uses the variations in $\beta$ for the objects being measured is often caused by variations in the manufacturing process that produced the objects, making the above equation almost useless.

A good example of this problem is in the measurement of the temperature of a silicon wafer, used in the manufacture of integrated circuits, in a rapid thermal annealer or in a selective CVD system. The emissivity variation from wafer to wafer may be as much as 50 percent, which can produce a temperature uncertainty of 20 percent or more; this is far too large for good process control.

The radiating body whose temperature is being measured is assumed to have a substantially uniform temperature. Such a body will radiate electromagnetic radiation ("light") at all wavelengths according to the Planck analysis of blackbody radiation. Planck's formula for the spectral distribution of blackbody radiation is derived and discussed in L. D. Landau and E. M. Lifshitz, *Statistical Physics*, Pergamon Press, 1958, pp. 172–179 and is given by $$dE_\omega = (Vh/\pi^2 c^3) \omega^3 d\omega/[\exp(h\omega/kT) - 1], \quad (1)$$

in terms of angular frequency $\omega$, and $$dE_\lambda = 16\pi^2 chVd\lambda/\lambda^5[e^{hc/\lambda kT} - 1] \quad (2)$$

in terms of wavelength $\lambda = 2\pi c/\omega = c/\nu$. Here h ($= 6.62 \times 10^{-27}$ erg-sec) is Planck's constant, V is the volume of the body, k($= 1.38 \times 10^{-16}$ erg/°K) is the Stefan-Boltzmann constant and c ($= 3 \times 10^{10}$ cm/sec.) is the velocity of light in a vacuum.

If one integrates $dE_\omega$ above over all angular frequencies $\omega$ one obtains as usual the total energy radiated by the body $$E_T = (4\sigma V/3c)T^4 \text{ (ergs)},$$

$$\sigma = \pi^2 k^4/60h^3 c^2 = 5.67 \times 10^{-5} gm/sec^3 (°K)^4.$$

Use of this relation is subject to the infirmities discussed above.

The invention approaches this differently, by decomposing the wavelength range or (angular) frequency range of radiation emitted by the body into two or more predetermined adjacent sub-ranges, in each of which the emissivity $\beta$ of the body at that temperature is substantially constant (dependence of $\beta$ upon $\lambda$ or $\omega$ is assumed to be weak so that $\beta$ is approximately constant in each sub-range). The portion of energy $\Delta E_{80}$ in each of the sub-ranges of interest is then determined. This yields a sequence of $n (\geq 2)$ or more simultaneous equations in $n+1$ unknowns, and by adopting one additional assumption this sequence can be solved for the unknowns.

If one integrates Eq. (2) for a greybody with emissivity $\beta_{80} < 1$ and wavelength range $\lambda_1 \leq \lambda \leq \lambda_2$ one obtains $$\int_{\lambda_1}^{\lambda_2} \beta_\lambda dE_\lambda = \Delta E_{12} = 8\pi chV \int_{\lambda_1}^{\lambda_2} \frac{\beta_\lambda d\lambda}{\lambda^5[\exp(hc/\lambda kT) - 1]} \quad (3)$$

The temperature range of particular interest here is 350° C. $\leq T \leq 1500$° C. or 0.054 eV $\leq kT \leq 0.153$ eV, and the wavelength range of particular interest is 0.5 $\mu$m(2.48 eV) $\leq \lambda \leq 3$ $\mu$m(0.413 eV). Thus, $h\nu kT = hc/\lambda kT >> 1$ for the wavelength and temperature ranges of interest so that the square bracketed term in the denominator in Eq. (3) may be replaced by the term $\exp(hc/\lambda KT)$. Further, using the mean value theorem from calculus the term $\beta$ in the integrand may be replaced by a constant term $\beta_c$, and the relation in Eq. (3) becomes $$\Delta E_{12} = 8\pi ch V\beta \, F(\lambda_1,\lambda_2;T) \quad (4)$$

$$F(\lambda_1,\lambda_2;T) = \int_{\lambda_1}^{\lambda_2} \frac{d\lambda}{\lambda^5} \exp(-hc/\lambda kT) \approx \frac{\lambda_2 - \lambda_1}{(\lambda_{12})^5} \exp(-hc/\lambda_{12}kT), \quad (5)$$

where $\lambda_{12}$ is an approprIate wavelength in the interval $(\lambda_1,\lambda_2)$: $\lambda_{12}^5 = 4\lambda_1^4\lambda_2^4/(\lambda_1+\lambda_2)(\lambda_1^2+\lambda_2^2)$ Equation (3) may be rewritten as $$R_{12} = \frac{1}{V} \frac{\Delta E_{12}}{\lambda_1 - \lambda_2} = 8\pi ch\beta \exp\{-hc/\lambda_{12}kT\}/\{\lambda_{12}\}^5, \quad (6)$$

where the quantity $R_{12}$ can be experimentally determined.

Equation (6) can be restated in terms of logarithms as $$\log_e\{8\pi ch/\lambda_{12}^5 R_{12}\} = hc/\lambda_{12}kT - \log_e\beta. \quad (7)$$

An analogous relation can be written for an adjacent wavelength interval $\lambda_3 \leq \lambda \leq \lambda_4$; this second interval may, but need not, partially overlap the first wavelength interval $\lambda_1 \leq \lambda \leq \lambda_2$. If the two wavelength intervals $((\lambda_1, \lambda_2)$ and $(\lambda_3, \lambda_4)$ are sufficiently small and sufficiently close to one another, a common value of emissivity $\beta$ may be used and Eq. (7) for each wavelength interval becomes $$\log_e\{c_1/\lambda_{12}^5 R_{12}\} = c_2/\lambda_{12}T - \log_e\beta, \quad (8)$$

$$\log_e\{c_1/\lambda_{34}^5 R_{34}\} = c_2/\lambda_{34}T - \log_e\beta, \quad (9)$$

$c_1 = 8\pi hc,$ $c_2 = hc/k,$ $\lambda_{12}^5 = 4\lambda_1^4\lambda_2^4/(\lambda_1+\lambda_2)(\lambda_1^2+\lambda_2^2),$ $\lambda_{34}^5 = 4\lambda_3^4\lambda_4^4/(\lambda_3+\lambda_4)(\lambda_3^2+\lambda_4^2),$ for which the formal solutions are $$\frac{1}{T} = \log_e\{\lambda_{34}^5 R_{34}/\lambda_{12}^5 R_{12}\}\lambda_{12}\lambda_{34}/c_2\{\lambda_{34} - \lambda_{12}\}, \quad (10)$$

$$\log_e\beta = [\lambda_{12}\log_e\{c_1/\lambda_{12}^5 R_{12}\} - \lambda_{34}\log_e\{c_1/\lambda_{34}^5 R_{34}\}]/\{\lambda_{34}-\lambda_{12}\}. \quad (11)$$

Also, it may be important to measure four or five separate wavebands due to non-thermal emission effects, such as optical resonances and fluorescence, that may produce false measurements for one or two of the wavebands. A microprocessor can delete these false readings and ignore them if four or five bands are measured instead of only two.

Figure 2:
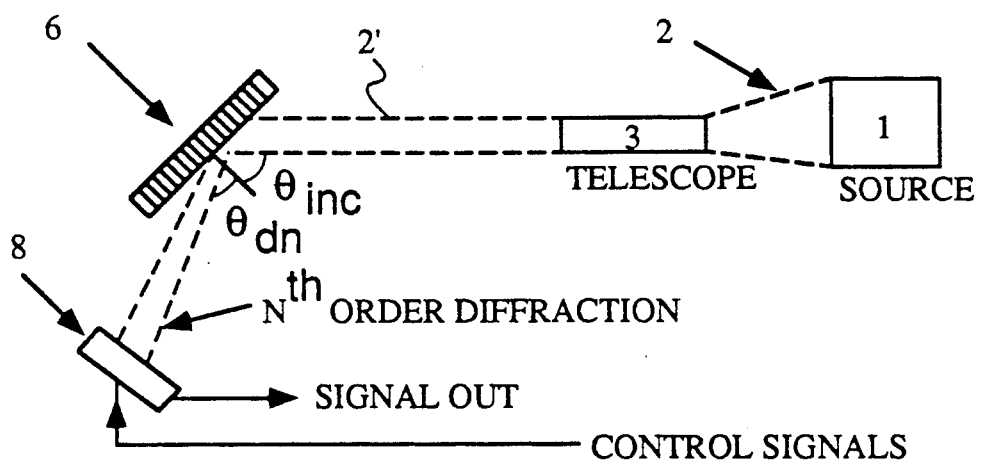
Figure 3:
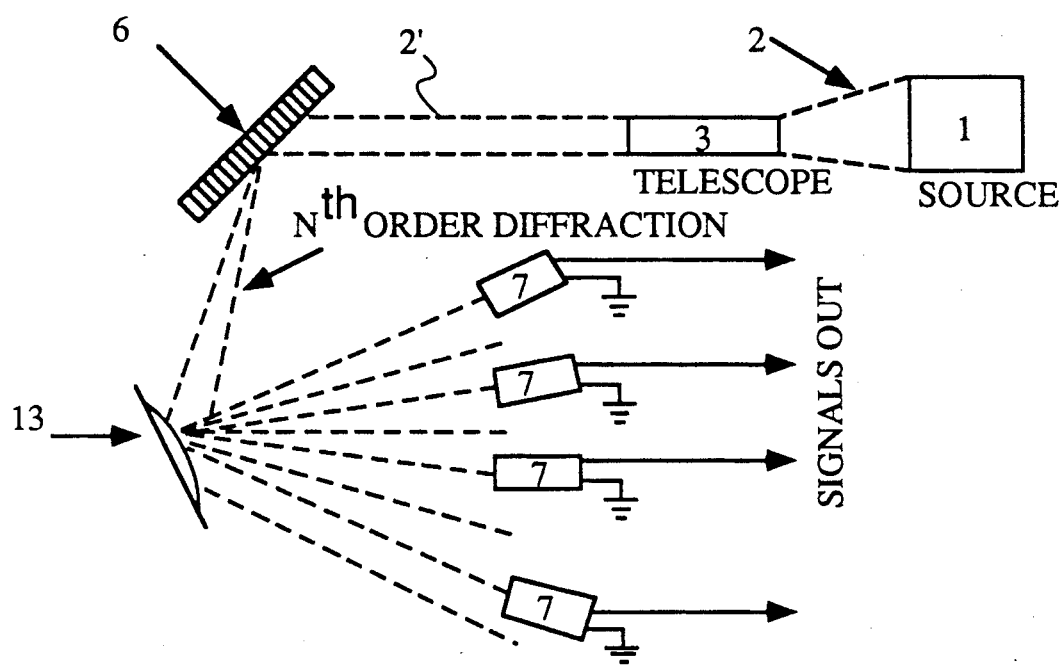
FIG. 3 is a schematic view of a modification of the embodiment of FIG. 2, used to produce and analyze a plurality of wavelength ranges.

The apparatus to measure the lefthand quantities in Equations (8) and (9) above, by isolation of two or more wavelength or frequency bands, can take one of at least three forms, as illustrated in FIGS. 1, 2 and 3. The approach shown in FIG. 1 uses beam splitters, band filters and discrete photodetectors to produce and analyze the wavelength bands. The radiating object 1 produces infrared radiation (indicated by the space between the dashed lines), part of which is collected and collimated by a telescope 3 or similar means and is directed toward a first infrared beam splitter 4A. The beam splitter 4A produces two partial beams 2B and 2C of infrared radiation having the same frequency composition as the collimated beam 2A received by the beam splitter 4A from the telescope 3. The partial beam 2B is received by a second beam splitter 4B that further splits the partial beam 2B into two partial beams 2B1 and 2B2, each having substantially the same wavelength composition as the original beam 2A. The partial beam 2B1 is received by an optical beam pass filter 5B1 that passes only a first narrow band of wavelengths such as $\lambda_1 \leq \lambda \leq \lambda_2$; and this narrow band radiation is received by an infrared photodetector 7B1 that is optimized for sensitivity to this narrow band of wavelengths. The photodetector would produce a signal representing a quantity such as $\Delta E_{12}$ shown in Equation (4). In a similar manner, three other narrow bands of wavelengths may be produced by passing the associated partial beams of radiation 2B2, 2C1 and 2C2 through narrow band pass filters 5B2, 5C1 and 5C2, respectively, and passing the resulting narrow band radiation to three more infrared photodetectors 7B2, 7C1 and 7C2, respectively, that are also optimized for sensitivity to the narrow band of wavelengths received by each photodetector. This approach is, of course, not limited to production and analysis of four narrow bands of wavelengths; any number of narrow bands of wavelengths, overlapping or nonoverlapping, may be produced and analyzed by the apparatus illustrated in FIG. 1.

FIG. 2 illustrates the use of a monolithic detector array for producing and analyzing narrow bands of wavelengths. A radiating object 1 produces infrared radiation 2, and a portion of this radiation is received by a telescope 3 and collimated into a beam 2' that is directed toward an infrared diffraction grating 6 that is oriented with a non-zero incidence angle $\theta_{inc}$ relative to the incoming beam 2'. Diffraction of the incoming beam 2' by the grating 6 produces many orders of diffraction, each of which will be re-radiated from the diffraction grating 6 at a somewhat different diffraction angle $\theta_{dn}$ (for the nth order diffraction). Each order of diffraction of interest may be received by a suitably positioned infrared photodetector that is part of a photodetector array 8, where each such photodetector is optimized for sensitivity to a particular interval of radiation wavelengths that are received by such photodetector array 8.

FIG. 3 illustrates a monolithic detector array that uses discrete detectors. The radiating object 1 produces infrared radiation 2, part of which is collected and collimated by a telescope or similar means 3 and is directed to an infrared diffraction grating 6 as in FIG. 2. Each predetermined wavelength band (nth order) is received and reflected by a cylindrical, spherical or other convex reflector 13 that directs each of the wavelength bands to a different infrared photodetector 7 that is optimized for sensitivity to that particular wavelength band.

Figure 4:
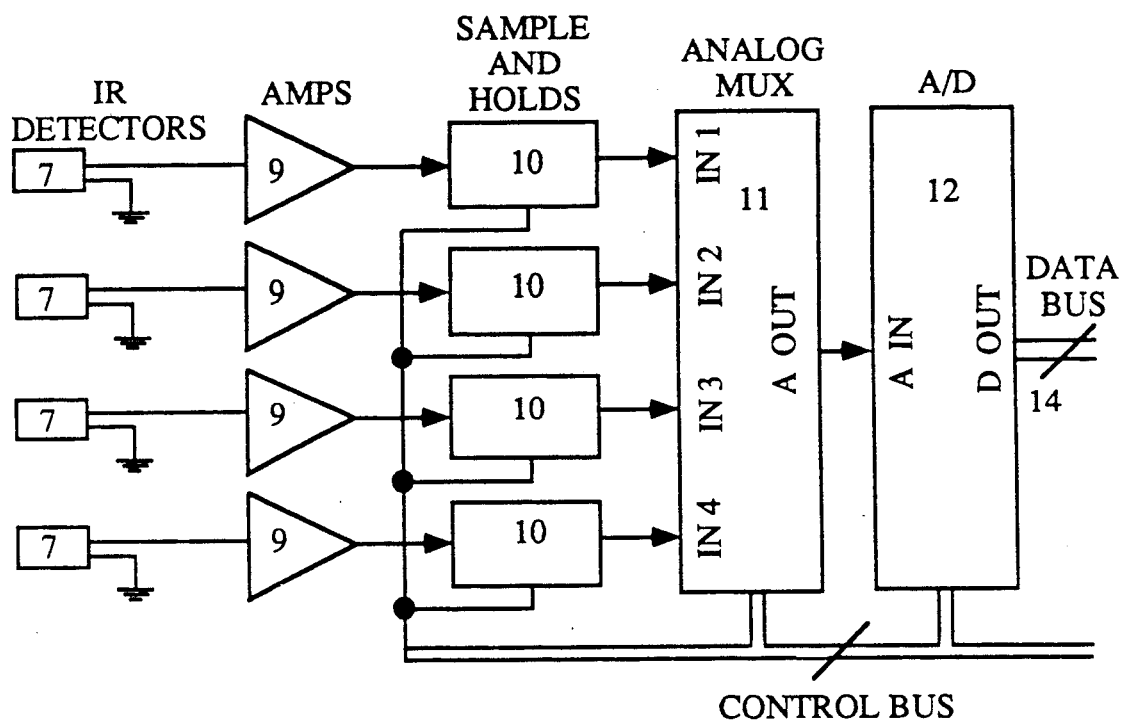
FIGS. 4 and 5 are schematic views of electrical configurations that may be used in determining the temperature and thermal emissivity of a radiating body using two options according to the invention.

FIG. 4 illustrates an electronic control circuit suitable for use with the discrete detector approaches illustrated in FIGS. 1 and 3. Each infrared photodetector 7 in an array of such photodetectors receives a narrow wavelength band of radiation, which produces a photodetector output signal that varies with the intensity of the wavelength band of radiation received. The photodetector output signal is received by a low noise, high gain amplifier 9 whose amplified output is directed to a sample-and-hold circuit 10 that is used to provide discrimination in time of the radiation received by the associated detector 7. Each sample-and-hold circuit 10 produces an output signal for one of the narrow bands of radiation wavelength of interest; and the sample-and-hold circuit 10 output signals are all directed to an analog multiplexer 11 that provides switching of analog signals received through a single output terminal to a single analog-to-digital (A/D) converter that provides an output signal for a data bus 14. The logarithms of the quantities of interest may also be formed within the multiplexer 11 so that the output signals from the multiplexer 11 are the quantities that appear in Equations (8) and (9) above.

Figure 5:
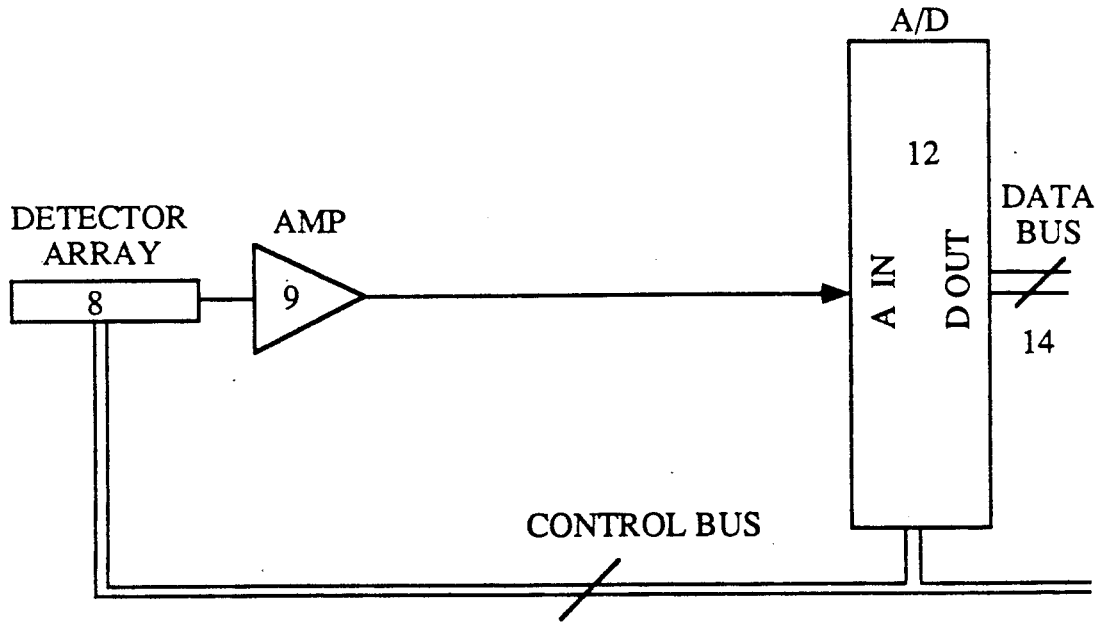

FIG. 5 illustrates a control circuit suitable for use with the monolithic detector array approach illustrated in FIG. 2. An infrared photodetector from an array 8 of such detectors receives the nth order diffraction as an input signal and passes the photodetector output signal to a low noise, high gain amplifier 9 that passes the amplified signal directly to an A/D converter 12 whose digitized output is delivered directly to a data bus 14. Logarithms of the quantities shown in Equations (8) and (9) may be formed within the A/D module 12 or elsewhere as desired.

The sample-and-hold devices shown in FIG. 4 are used to ensure that all the wave bands are measured at the same time or within the same designated time intervals. The electronics for the monolithic detector array of FIG. 2, shown in FIG. 5, would not require the sample-and-hold devices or the analog multiplexer and would need only one amplifier as these functions would effectively be performed by the monolithic detector array under control of additional electronics that would be directed by the control signals on a control bus. The design of the control electronics would depend on the choice of the particular detector to be used.

One additional requirement of the system is that all optical components of the system must be transparent (transmission $\geq 80\%$) from 500 nm to 3000 nm. This will produce accurate temperature readings down to 400° C. A requirement of this type means that the optics should be made of infrared transmitters such as sapphire or $CaF_2$.

In view of the above, what has been disclosed is a novel improved apparatus and/or a novel improved method for determining the temperature T and the radiative emissivity $\beta$ of a thermally radiating body of volume V using two predetermined, adjacent, small wavelength ranges $\lambda_1 \leq \lambda \leq \lambda_2$ and $\lambda_3 \leq \lambda \leq \lambda_4$, the method comprising the steps of:

measuring the energy $\Delta E_{12}$ radiated by the body in the first wavelength range $\lambda_1 \leq \lambda \leq \lambda_2$ and forming a differential $R_{12} = \Delta E_{12}/(\lambda_2 - \lambda_1)V$;

measuring the energy $\Delta E_{34}$ radiated by the body in the second wavelength range $\lambda_3 \leq \lambda \leq \lambda_4$ and forming a differential $R_{34} = \Delta E_{34}/(\lambda_4 - \lambda_3)V$;

expressing the natural logarithms $\log_e(R_{12})$ and $\log_e(R_{34})$ as linear combinations of the variables $\log_e \beta$ and $1/T$ in the form $$\log_e(R_{12}) = a_{12} + b_{12}\log_e(\beta) + c_{12}\left(\frac{1}{T}\right)$$

$$\log_e(R_{34}) = a_{34} + b_{34}\log_e(\beta) + c_{34}\left(\frac{1}{T}\right)$$

where $a_{12}$, $B_{12}$, $c_{12}$, $a_{34}$, $b_{34}$ and $c_{34}$ are parameters that are substantially independent of the variables $\beta$ and T and each such parameter may be determined from a knowledge of the wavelength values $\lambda_1$ and $\lambda_2$ or of $\lambda_3$ and $\lambda_4$;

determining the quantities T and $\beta$ substantially according to the relations $$\frac{1}{T} = \frac{b_{34}(\log_e(R_{12}) - a_{12}) - b_{12}(\log_e(R_{34}) - a_{34})}{c_{12}b_{34} - c_{34}b_{12}}$$

$$\log\beta = \frac{c_{12}(\log_e(R_{34}) - a_{34}) - c_{34}(\log_e(R_{12}) - a_{12})}{c_{12}b_{34} - c_{34}b_{12}}$$

In the above method, the step of choosing the parameters $a_{12}$, $B_{12}$, $c_{12}$, $a_{34}$, $b_{34}$, and $c_{34}$, may be substantially as follows:

$a_{12} = \log_e(8\pi hc/\lambda_{12}^5)$,
$a_{34} = \log_e(8\pi hc/\lambda_{34}^5)$,
$b_{12} = b_{34} = 1$,
$c_{12} = -hc/k\lambda_{12}$,
$c_{34} = -hc/k\lambda_{34}$,
$\lambda_{12} = [4\lambda_1^4\lambda_2^4/(\lambda_1+\lambda_2)(\lambda_1^2+\lambda_2^2)]^{1/5}$
$\lambda_{34} = [4\lambda_3^4\lambda_4^4/(\lambda_3+\lambda_4)(\lambda_1^2+\lambda_2^2)]^{1/5}$ Although the preferred embodiment of the invention has been shown and described herein, variation and modification may be made without deporting from the scope of the invention.

We claim:

1. With respect to an energy radiating body having an unknown temperature T and an unknown radiative emissivity parameter $\beta$, a method for measuring at least one of the temperature T and the radiative emissivity parameter $\beta$ of the [in two predetermined, adjacent, small wavelength ranges $\lambda_1 \leq \lambda \leq \lambda_2$ and $\lambda_3 \leq \lambda \leq \lambda_4$ of a thermally] energy radiating body, [of volume V], the method comprising the steps of:

receiving energy radiated from said body at a distance from said body;

measuring a first spectral intensity of the received energy corresponding to a first spectral portion of the received energy, $\Delta E_{12}$, [radiated by the body in the] which is contained within a first wavelength range $\lambda_1 \leq \lambda \leq \lambda_2$;

generating a first signal representative of said first spectral intensity; [and forming a first differential $R_{12} = \Delta E_{12}/(\lambda_2 - \lambda_1)V$];

measuring a second spectral intensity of the received energy corresponding to a second spectral portion of the received energy, $\Delta E_{34}$, [radiated by the body in the] which is contained within a second different wavelength range $\lambda_3 \leq \lambda \leq \lambda_4$, where the second wavelength range $\lambda_3 \leq \lambda \leq \lambda_4$ is chosen to be sufficiently narrow and close to said first wavelength range $\lambda_1 \leq \lambda \leq \lambda_2$ such that the radiative emissivity parameter $\beta$ of the body is substantially the same in both said first and second wavelength ranges;

generating a second signal representative of said second spectral intensity; and supplying said first and second signals to a signal processing means, said signal processing means being adapted for generating at least one of a first output signal representing the temperature T of said body and a second output signal representing the radiative emissivity parameter $\beta$ of said body.

2. The measuring method of claim 1 wherein the body has a predetermined volume V, the method further comprising the steps of:

forming a first ratio signal representing a differential ratio, $R_{12} = \Delta E_{12}/(\lambda_2 - \lambda_1)V$, wherein $\Delta E_{12}$ is the first spectral intensity measured in said first wavelength interval, $\lambda_1$ and $\lambda_2$ are such that $\lambda_1 \leq \lambda \leq \lambda_2$ defines said first wavelength interval, and V is the volume of said energy radiating body;

forming a second ratio signal representing a differential ratio, $R_{34} = \Delta E_{34}/(\lambda_4 - \lambda_3)V$, wherein $\Delta E_{34}$ is the second spectral intensity measured in said second wavelength interval, $\lambda_3$ and $\lambda_4$ are such that $\lambda_3 \leq \lambda \leq \lambda_4$ defines said second wavelength interval, and V is the volume of said energy radiating body;

generating equation signals to represent the logarithms $\log_e(R_{12})$ and $\log_e(R_{34})$ in terms of linear equations including the variables, $\log_e \beta$ and $1/T$, where the coefficients of these linear equations are predetermined; and determining the values of the variables, $\log_e \beta$ and $1/T$, from the equation signals representing these linear equations.

3. The method of claim 1 further comprising the machine-implemented steps within the signal processing means of:

forming a first differential ratio of a form:

$$R_{12} = \Delta E_{12}/(\lambda_2 - \lambda_1)V$$

where $\Delta E_{12}$ is the intensity of energy measured in said first-wavelength interval, and $\lambda_1$ and $\lambda_2$ are such that $\lambda_1 \leq \lambda \leq \lambda_2$ defines said first wavelength interval, and V is the volume of said thermally radiating body;

forming a second differential ratio of a form:

$$R_{34} = \Delta E_{34}/(\lambda_4 - \lambda_3)V$$

where $\Delta E_{34}$ is the intensity of energy measured in said second wavelength interval, and $\lambda_3$ and $\lambda_4$ are such that $\lambda_3 \leq \lambda \leq \lambda_4$ defines said second wavelength interval, and V is the volume of said thermally radiating body;

expressing the natural logarithms $\log_e(R_{12})$ and $\log_e(R_{34})$ as linear combinations of unknown variables $\log_e \beta$ and $1/T$ in equations having a form:

$$\log_e(R_{12}) = a_{12} + b_{12} \log_e(\beta) + c_{12}(1/T)$$

$$\log_e(R_{34}) = a_{34} + b_{34} \log_e(\beta) + c_{34}(1/T)$$

where $a_{12}$, $b_{12}$, $c_{12}$, $a_{34}$, $b_{34}$, and $c_{34}$ are parameters that are substantially independent of the unknown variables $\beta$ and $T$ and each such parameter is determined from at least one of the wavelength values, $\lambda_1$, $\lambda_2$, $\lambda_3$ and $\lambda_4$;

solving for the unknown variables, $T$ and $\beta$, substantially according to the relations $$\frac{1}{T} = \frac{b_{34}(\log_e(R_{12}) - a_{12}) - b_{12}(\log_e(R_{34}) - a_{34})}{c_{12}b_{34} - c_{34}b_{12}}$$

$$\log_e \beta = \frac{c_{12}(\log_e(R_{34}) - a_{34}) - c_{34}(\log_e(R_{12}) - a_{12})}{c_{12}b_{34} - c_{34}b_{12}}.$$

4. The method of claim 3 wherein the step of choosing the parameters $a_{12}$, $b_{12}$, $c_{12}$, $a_{34}$, $b_{34}$, and $c_{34}$ is substantially as follows:

$a_{12} = \log_e (8\pi hc/\lambda_{12}^5)$,
$a_{34} = \log_e (8\pi hc/\lambda_{34}^5)$,
$b_{12} = b_{34} = 1$,
$c_{12} = -hc/k\lambda_{12}$,
$c_{34} = -hc/k\lambda_{34}$,
$\lambda_{12} = [4\lambda_1^4 \lambda_2^4/(\lambda_1 + \lambda_2)(\lambda_1^2 + \lambda_2^2)]^{1/5}$
$\lambda_{34} = [4\lambda_3^4 \lambda_4^4/(\lambda_3 + \lambda_4)(\lambda_1^2 + \lambda_2^2)]^{1/5}$ 5. A measurement apparatus for measuring at least one of a temperature T and a radiative emissivity parameter $\beta$ belonging to [in two predetermined, adjacent, small wavelength ranges $\lambda_1 \leq \lambda \leq \lambda_2$ and $\lambda_3 \leq \lambda \leq \lambda_4$ of a thermally] an energy radiating body [of volume V], the apparatus comprising: [a telescope or similar]

radiation collimating means having an input end and an output end, the collimating means being positioned to [directly] receive a portion of the radiation emitted by the radiating body at the input end and to produce a substantially collimated output beam that issues from the output end;

wavelength discriminating means, positioned to receive the collimated output beam from the radiation collimating means and to produce therefrom first and second beam components whose energies are substantially confined in respective first and second wavelength intervals; [with each beam component corresponding to the intensity in the original beam for a predetermined wavelength interval, with one such wavelength interval being a first predetermined interval $\lambda_1 \leq \lambda \leq \lambda_2$ and a second such wavelength interval being a second predetermined interval $\lambda_3 \leq \lambda \leq \lambda_4$,] where the respective first and second wavelength intervals of the first and second beam components are adjacent or partially overlapping with one another;

a first photodetector positioned to receive the first beam component [corresponding to the wavelength interval $\lambda_1 \leq \lambda \leq \lambda_2$] and to produce a first photodetector output signal whose current or voltage value [is approximately the quantity $\log_e[(\Delta E_{12})/(\lambda_2 - \theta_1)V]$ where $\Delta E_{12}$ is] represents the quantity of radiation energy contained [detected by the first photodetector means for wavelengths] in the first beam component [interval $\lambda_1 \leq \lambda \leq \lambda_2$];

a second photodetector positioned to receive the second beam component [corresponding to the wavelength interval $\lambda_3 \leq \lambda \leq \lambda_4$] and to produce a second photodetector output signal whose current or voltage value [is approximately the quantity $\log_e[\Delta E_{34}/(\lambda_4 - \lambda_3)V]$, where $\Delta E_{34}$ is] represents the quantity of radiation energy contained [received by the second photodetector means for wavelengths] in the second beam component [interval $\lambda_3 \leq \lambda \leq \lambda_4$]; and signal processing means, coupled to the first and second photodetectors, for receiving the first and second photodetector output signals and generating therefrom digital value signals which may be use to digitally compute at least one of the temperature T and radiative emissivity parameter $\beta$ of said energy radiating body.

6. A method for measuring a temperature level T in an energy radiating body comprising the steps of:

receiving energy radiated from said body;

measuring relative energy contents of the received energy in each of a plurality of relatively narrow, close but different wavelength ranges, said ranges being selected such that a radiative emissivity parameter $\beta$ of the radiating body is substantially the same for at least two close ones of said wavelength ranges; and solving a plurality of equations, each equation having as three unknown variables thereof: the temperature level T of the body, an emissivity parameter $\beta$ of the body and the relative energy content $\Delta E_{mm}$ radiated by the body in a corresponding wavelength range $\lambda_m \leq \lambda \leq \lambda_n$;

where said solving step includes the steps of assuming a same temperature level T in said plurality of equations, assuming a same emissivity parameter $\beta$ in said plurality of equations, and using the measured relative energy contents of at least two close ones of said wavelength ranges for the respective $\Delta E_{mm}$ values in said plurality of equations.

* * * * *